Figure 1:
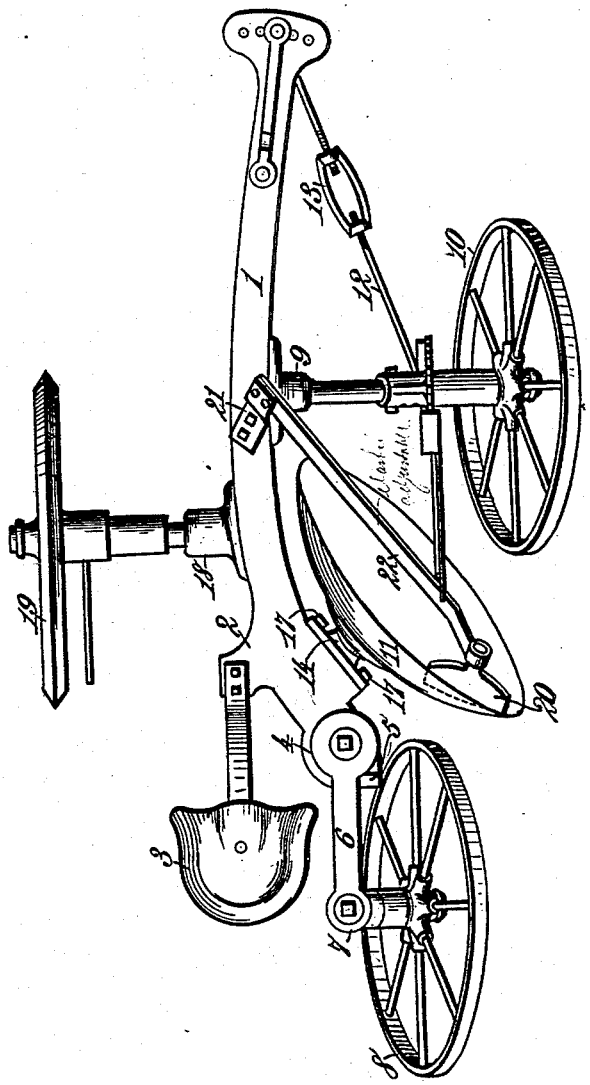

(No Model.)  3 Sheets—Sheet 1.
C. A. HARDY.
ROTARY DISK PLOW.

No. 556,972. Patented Mar. 24, 1896.

Witnesses.
Robert Everett,
Geo. W. Rea.

Inventor.
Clement A. Hardy.
By James L. Norris.
Atty.

(No Model.) 3 Sheets—Sheet 2.

C. A. HARDY.
ROTARY DISK PLOW.

No. 556,972. Patented Mar. 24, 1896.

Witnesses.
Robert Everett.
Geo. M. Rea.

Inventor.
Clement A. Hardy
By James L. Norris
Atty.

(No Model.) 3 Sheets—Sheet 3.
C. A. HARDY.
ROTARY DISK PLOW.
No. 556,972. Patented Mar. 24, 1896.
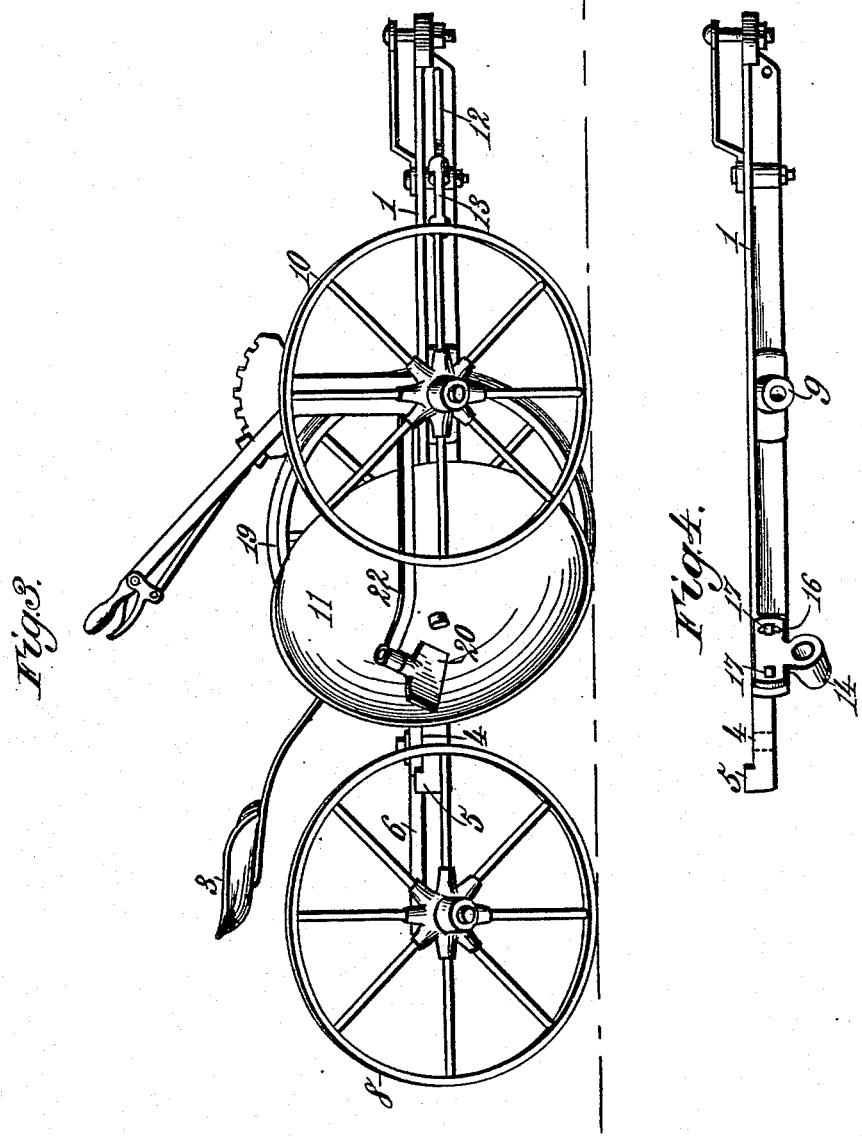
Witnesses.
Robert Everett,
Geo. W. Rea.
Inventor.
Clement A. Hardy.
By James L. Norris.
Atty.

UNITED STATES PATENT OFFICE.

CLEMENT A. HARDY, OF DALLAS, TEXAS, ASSIGNOR TO C. A. KEATING, OF SAME PLACE.

ROTARY-DISK PLOW.

SPECIFICATION forming part of Letters Patent No. 556,972, dated March 24, 1896.

Application filed July 31, 1895. Serial No. 557,751. (No model.)

*To all whom it may concern:*

Be it known that I, CLEMENT A. HARDY, a citizen of the United States, residing at Dallas, in the county of Dallas and State of Texas, have invented new and useful Improvements in Rotary-Disk Plows, of which the following is a specification.

My invention relates to rotary-disk plows constructed with one or more plowing-disks arranged diagonally to the line of draft and suitably supported by furrow and landside wheels and a suitable metal or wooden frame.

My present invention has for its purpose the provision of a construction and combination of parts whereby the plow-disks shall be drawn into the earth by their own action and by the weight of the soil lifted by the disks and carried on their faces and have a cutting action on the bottom of the furrow instead of scraping, thereby enabling me to dispense with the considerable weight which it has been thought necessary to use heretofore in this class of plows in order to force the disks into the soil and hold them to their work, whereas by my improvement I am able to dispense with all weight save that which is required for substantial strength and to materially simplify and reduce the expense of manufacture. It is my purpose, also, to provide a plow of the type named having one or more plowing-disks of concave form arranged diagonally to the line of draft, and having an adjustable inclination to the vertical, whereby said disk or disks are inclined rearwardly and across the line of draft at such an angle as will effect a clearance between the back edge of the disk and the bottom of the furrow, whereby I avoid unnecessary friction and cause the disk to be drawn into the soil by its own action, the inclination giving the disk's suction and drawing it into the ground by the forward motion of the plow and by the weight of the soil carried up by the disk, and the side pressure of said plowing-disk being resisted by furrow and caster wheels.

My invention also aims at the provision of simple means for discharging the soil from the disk and turning or aiding in turning it over in order to cover the trash and stubble, the combination, with the plow-frame, of means for adjusting the forward furrow or guide wheel to vary the width of the furrow for different conditions of soil, and to so arrange the landside-wheel relatively to the plowing-disk that it shall form a pivotal support by which the plow may be turned easily at the corner or end of the furrow.

The invention consists, to the several ends specified, in the novel features of construction and new combinations of parts hereinafter fully explained, and then particularly pointed out and defined in the claims which conclude this specification.

To enable others to fully understand and to practice my said invention, I will now describe the same in detail, making reference for this purpose to accompanying drawings, in which—

Figure 2:
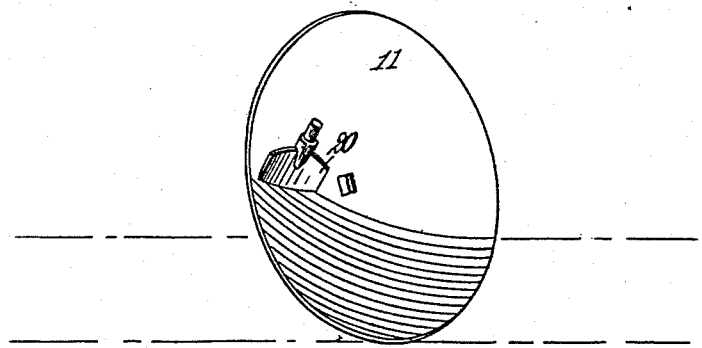
Figure 5:
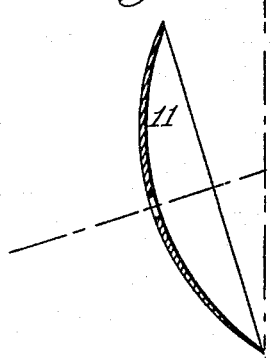
Figure 6:
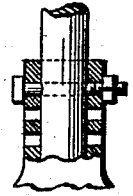
Figure 7:
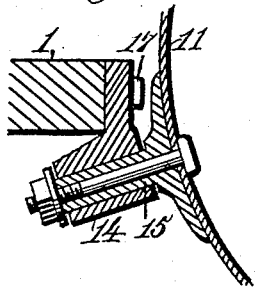

Figure 1 is a plan view of a plow embodying my invention. Fig. 2 is a diagram and partial perspective illustrating the action of the plow-disk in the soil and the operation of the scraper. Fig. 3 is a side elevation of the plow shown in Fig. 1. Fig. 4 is a side elevation of the frame of the plow, the operative parts being detached. Fig. 5 is a diagram and partial perspective illustrating the position of the plow-disk with relation to the angle of its axis of rotation in the vertical. Fig. 6 is a detail view showing the means for effecting the lateral adjustment of the furrow-wheel. Fig. 7 is a detail view illustrating the means whereby the angular position of the plowing-disk is adjusted.

The reference-numeral 1 in said drawings indicates the frame of the plow, which is shown in detail in Fig. 4. It consists of a fore-and-aft beam having a slight curvature in a horizontal plane, whereby it presents a small degree of convexity upon the landside edge or face, as shown in Fig. 1. At its rearward end this curvature is more pronounced in order to give clearance to the plow-disk, as will be explained presently. A bracket 2 is projected upon the landside edge at a little distance in front of the rearward extremity to provide support for a seat 3. At the rearward end is formed a bearing 4 and stop 5 for a swinging arm 6, the latter being provided with a suitable bearing 7, in which is supported the spindle of a caster-wheel 8, the stop 5 being so located that the swinging arm will be held substantially in parallelism with the line of draft. The spindle of the caster-wheel is preferably inclined downward, so that the caster-wheel stands at an angle of inclination with a vertical plane parallel with the line of draft.

The forward end of the frame 1 is provided with a clevis or other suitable means of attachment for the doubletree, and not far from midway of this end and the point of attachment of the caster-wheel is attached a rigid bearing 9 for the axle or spindle of a furrow-wheel 10, which stands at substantially the same angle to the vertical as the caster-wheel. This bearing is preferably made integral with the frame 1 and may be cast in one piece therewith. A brace 12 connects the wheel-mount to the forward end of the frame 1, and a turnbuckle 13, interposed in said brace, enables the latter to be so adjusted as to length as to give the necessary degree of support to the furrow-wheel and also such adjustment as may be required when the said wheel is placed at varying distances from the beam or frame to vary the width of the furrow.

Between the bearing for the furrow-wheel and the pivotal axis of the caster-wheel is provided a box or other suitable form of bearing 14 for the spindle 15 of a plow-disk 11. This disk is concave or concavo-convex, and its spindle is at the center of the disk and at a right angle to its plane of rotation. The inclination of this spindle is subject to variation, and it is for the purpose of enabling this adjustment to be made that I have provided a slot in the box or bearing 14, in which the spindle supporting the disk 11 revolves. It may be clamped with any required force and in any desired position against its support by means of bolts 17. I have ascertained, however, that by inclining the disk so that it will cross the line of draft diagonally and also giving it an inclination rearward and toward the landside at such an angle that the rear edge of the disk shall have clearance in the furrow, the revolution of the disk will cause it to be drawn into the soil without requiring any other force than the normal weight of the structure, which is no greater than is required to impart substantial strength. I am able, therefore, to wholly dispense with the considerable weights with which the plow-frame has heretofore been loaded in plows of this type. Moreover, the construction and arrangement described give to the disk 11 a cutting action at its edge, at the bottom of the furrow, and prevent the scraping action which takes place when other arrangements are employed. By so inclining the disk the weight of the soil resting upon the disk while it is being raised from the furrow assists in drawing the disk into the ground.

The diagonal arrangement and rearward and lateral inclination of the plow-disk must necessarily produce a side draft toward the unplowed ground, and to properly sustain the same and keep the plow in its furrow I employ the furrow-wheel and caster-wheel already described, the stop 5 upon the rearward end of the frame 1 being so located as to hold the swinging arm 4, carrying the caster-wheel, in substantial parallelism with the line of draft, but permitting said arm to turn in the direction of the landward side.

Upon the landward side of the frame and substantially in line with the forward edge of the plow-disk is a bearing 18 for the landside-wheel 19. This bearing is preferably formed in one piece with the frame and may be in a horizontal plane at right angles to the line of draft, as vertical supports only are required. The location of the bearing 18 at the point shown and described enables the landside-wheel to act, practically, as a pivotal support for the frame in turning at the corners, or at the ends of the furrow, the swinging arm carrying the caster-wheel being turned away from its stop 5, thus enabling the caster-wheel to roll in the arc of movement described from the point on which the landside-wheel is supported. I also provide a scraper-blade and moldboard 20, adjustably mounted upon a bracket 21, formed or mounted upon the part which supports the furrow-wheel and capable of a limited adjustment in the direction of the length of its staff 22. Said staff is of such length that the scraper-blade secured to one end thereof bears upon the concave or working face of the disk in rear of its center of revolution and in the line of the soil raised by said disk. The staff 22 is of suitable elasticity to allow an easy adjustment against the face of the plow-disk. The position of the scraper when the plow is in operation is shown approximately in Fig. 2 of the drawings, the curved lines showing the line of travel of the soil carried up by the disk.

Among the advantages of this plow it may be stated that a disk plow constructed as shown and described pulverizes the soil perfectly and leaves it in a most perfect condition, so that it requires little preparation to form a fine seed-bed without great additional labor. It also leaves the bottom of the furrow porous and open, allowing it to absorb moisture and allowing the moisture from below to pass up into the plowed soil, in place of compressing the soil in the bottom of the furrow and forming a layer which is practically impervious to moisture, as moldboards and shares on ordinary plows do.

In ordinary moldboard-plows the entire weight of the soil turned by the plow is carried on the bottom of the share and landside, and this smoothes the bottom of the furrow and compresses it, rendering it practically impervious to moisture in certain characters of soil. Crops put in with a disk plow in dry seasons, by reason of the bottom of the furrow being left porous, draw moisture from the subsoil, which is not possible to any great extent with other plows. In addition to this, the disk plow is of lighter draft than any other form of plow tested in competition with it, considering the volume of earth turned. In hard ground its advantages are especially obvious. It will plow ground so hard that moldboard-plows cannot be made to operate in it at all. In wet or sticky ground it will scour perfectly and clean itself when no other plow will work with any degree of satisfaction. In turning under trash and stubble on top of the soil it buries it at the bottom of the furrow, instead of placing it at the edge of the furrow, as moldboard-plows do, and thereby places the trash in position so it will easily rot and form a mulch in the soil.

What I claim is—

1. In a rotary plow, the combination with a plow-beam, of a box-bearing mounted on the plow-beam and adjustable to different angles of inclination, an inclined axle rotatable in said box-bearing and having its angle of inclination adjustable therewith, a plowing-disk secured to the said axle, rotated solely by the natural draft thereof and the friction of the soil, set diagonally to the line of draft and inclined out of a vertical plane for cutting the furrow and turning the soil therefrom, an axle extending from one side of the plow-beam and carrying a landside-wheel, a separate axle extending from the opposite side of the frame and carrying a furrow-wheel, the landside-wheel being located with its axle approximately opposite the front edge of the plowing-disk, and an arm pivotally mounted on the plow-beam in rear of the plowing-disk and provided with a caster-wheel which runs in the furrow last formed, said furrow-wheel and caster-wheel being inclined as shown to resist the lateral draft of the plowing-disk, and the arm of the caster-wheel having a stop which holds the caster-wheel approximately parallel with the line of draft but permits its free pivotal movement in the direction toward the landside, substantially as described.

2. In a rotary plow, the combination with a plow-beam, of a box-bearing arranged on the plow-beam, an axle rotatable in the box-bearing, a plowing-disk secured to the said axle, rotated solely by the natural draft thereof and the friction of the soil, set diagonally to the line of draft and inclined out of a vertical plane for cutting the furrow and turning the soil therefrom, a furrow-wheel mounted on an axle at the same side of the plow-beam as the plowing-disk and arranged in advance thereof, an arm pivoted to the rear portion of the plow-beam and provided with a caster-wheel arranged in rear of the plowing-disk, and a stop device for limiting the swinging motion in one direction of the arm carrying the caster-wheel, said furrow-wheel and caster-wheel being inclined for resisting the side pressure of the plowing-disk, substantially as described.

In testimony whereof I have hereunto set my hand in presence of two subscribing witnesses.

CLEMENT A. HARDY.

Witnesses:
  A. M. WHITE,
  C. M. RORK.